Dec. 29, 1936.  E. E. GILMER  2,065,801

SHINGLE PLANING MACHINE

Filed Sept. 9, 1935

Inventor

Ernest E. Gilmer.

Patented Dec. 29, 1936

2,065,801

UNITED STATES PATENT OFFICE 2,065,801

SHINGLE PLANING MACHINE

Ernest E. Gilmer, Portland, Oreg.

Application September 9, 1935, Serial No. 39,787

1 Claim. (Cl. 144—13)

This invention relates to improvements in machines for planing or processing shingles or other tapered or wedge-shaped sections of wood to form two or more types of superficial grooves upon one side thereof, particularly such as is described in my Patent Number 1,943,597, which process requires two or more cutting units to produce the desired product. This type of grooving is not practical in any of the machines now in operation.

The object of the invention is to provide a machine of the class described of simple and practical construction which will plane or groove tapered shingles or other similar shaped wood at a uniform depth throughout their lengths or at progressively increasing depths from or near their thinner edges until a predetermined depth of groove is attained whereupon the grooves will be maintained at a uniform depth for the remainder of the length of the material to be so processed. A further object of this invention is to provide means to form deeper grooves in the thicker portion only in such tapered shingles or wood to be so processed and thus provide a surface simulating the natural hand split effect of such woods or shingles, thus providing all the hand split effect on the portions of the shingle or tapered wood without cutting too deeply into the thinner portions and causing a weakness at such thinner portions, all as described in my Patent Number 1,943,597.

Other objects and advantages of my invention, and objects relating to details of construction and arrangements of parts will be readily apparent in the course of the detailed description to follow.

The accompanying drawing illustrates by way of example a representative form of my invention, in which.

Figure 1:
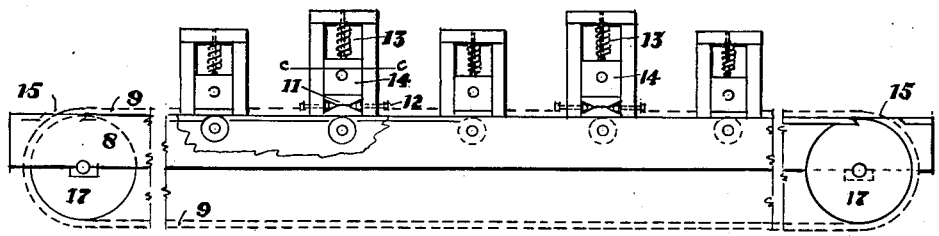
Fig. 1 is a partial view in side elevation of a machine embodying my invention, part of side frame cut out to show lower idler rolls.
Figure 2:
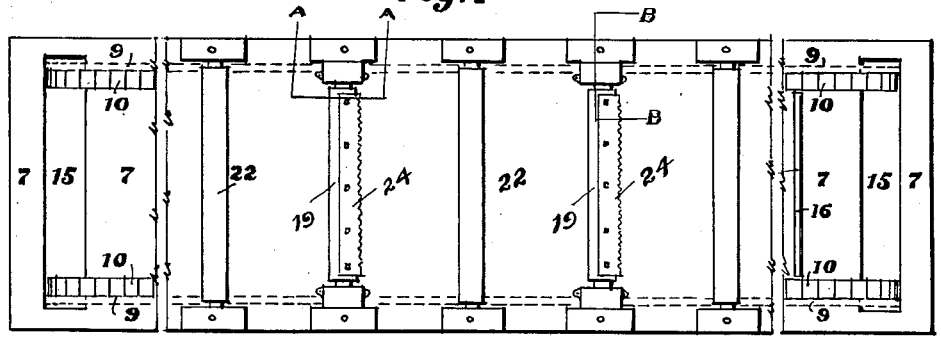
Fig. 2 is a top plan view of Fig. 1.
Figures 3, 4, 5:
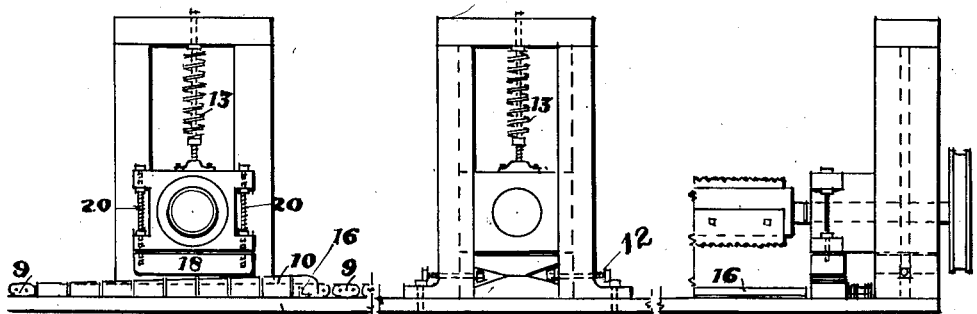
Fig. 3 is a partial view in vertical section of the same taken on line A—A of Fig. 2 showing cutter head, bearings, feed chain and adjusting links in section.
Fig. 4 is elevation view of cutter head bearing reverse of Fig. 3.
Fig. 5 is vertical view in section of cutter head, bearings, adjusting device and drive taken at line B—B Fig. 2.
Figure 6:
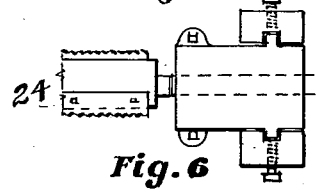
Fig. 6 is section of cutter head bearing and supporting guides taken at C—C Fig. 1.

Referring more in detail to the drawing:

Fig. 1 shows frame 8 supporting bed plate 7 on which are imposed bearing supports 14 for cutter head 19 and pressure rolls 22. Said bed plate 7 is made with openings permitting lower idler rolls under cutters 19 and pressure rolls 22 to project slightly above bed plate 7 to eliminate friction of shingles in line of progress.

Endless link chains 9 travel over bed plate 7 through openings 15 on to sprocket wheels 17 which are properly powered, to which chain 9 are attached at suitable distances sectional tapered blocks 10 which in line of progression engage adjusting block 18 causing the cutter head to travel upward in relation to the increasing thickness of the shingle being processed by being forced in line of progression by pusher bar 16 attached to adjusting links 10.

In the line of progression, bar 16 pushes against the thicker portion of the shingle as it rests on bed plate 7, links 10 being of approximately the thickness of said shingle in relation to their length and position and, travelling with the shingle, engage the adjusting slide block 18 causing cutter head 19 to rise in relation to increasing thickness of the tapered shingle. Said adjusting block 18 is adjustable by means of screws 20 to regulate the depth of cut or grooves to be imposed on the surface of the tapered shingle.

Each cutter head bearing frame is supplied with adjusting blocks 11 which are regulated by set screws 12, the object of which is to regulate the portion of cutter bearing 14 and regulate beginning of the cut or groove in the tapered shingle, whether same is to begin at the extreme tip or at any given point intermediate its length.

Rod and spring 13 imposed on top of bearing 14 provide for an even pressure of cutter head rolls 19 and eliminate the possibility of the cutting blades jumping or rising from cutting position.

The entire assembly in combination provides simple, economical and efficient means of performing the desired operation for which it is designed and to provide the two different types of cuts in the top surface of a tapered shingle as described in my Patent Number 1,943,597, which simply stated is as follows: The tapered shingle is placed on the bed plate 7 and pusher bar 16 contacts the thick end pushing the shingle in line of progression under pressure rolls 22 which hold the shingle down firmly, then under cutter head rolls 19 to which are attached cutter blades 24 to form the cuts or grooves, said cutter blades being regulated by the adjusting devices previously described, thus providing in one operation or one progressive line of travel the two forms of cuts or grooves as described in my said Patent 1,943,597.

Having thus described my invention, I claim:

In a shingle planing machine, a body having a plane bed, and supports for two or more cutter head frames, said frames having bearings supporting cutter heads and operating vertically in said supports, cutter heads journaled in the bearings in said frames and arranged to surface cut the top side of a tapered shingle advanced along said bed, endless chains operating on both sides of said plane bed, sectional tapered gauge links attached to said chains designed to contact the under-side of gauge blocks attached to the frames, said gauge links having a continuous taper corresponding to the taper of a shingle, means for adjusting the gauge blocks regulating the depth of cut or groove on said tapered shingle, means for adjusting said movable bearings regulating the point of beginning of cut or grooving on said shingle surface, the cut formed in the shingle by one cutter head being disposed in parallel with the upper face of the shingle and the cut formed by another cutter head beginning at a point intermediate the ends of the shingle and progressing to the thicker end of the tapered shingle in a line practically parallel to the lower surface of said shingle, producing two separate forms of cutting or grooving on the tapered shingle in single progression through the length of the machine.

ERNEST E. GILMER.